United States Patent [19]
Sand

[11] 3,719,026
[45] March 6, 1973

[54] SELECTIVE SORPTION OF NON-POLAR MOLECULES

[75] Inventor: Leonard B. Sand, Holden, Mass.

[73] Assignee: Zeochem Corporation, Worcester, Mass.

[22] Filed: June 1, 1971

[21] Appl. No.: 148,508

[52] U.S. Cl. .................55/33, 55/75, 252/455 Z
[51] Int. Cl. ...................B01d 53/04, B01j 11/40
[58] Field of Search...55/33, 70, 75, 389; 252/455 Z; 208/DIG. 2

[56] References Cited

UNITED STATES PATENTS

| | | | |
|---|---|---|---|
| 3,551,353 | 12/1970 | Chen et al. | 252/455 Z |
| 2,992,703 | 7/1961 | Vasan et al. | 55/75 |
| 3,164,453 | 1/1965 | Milton | 55/75 |
| 3,184,518 | 5/1965 | Sanders et al. | 55/75 |

Primary Examiner—Charles N. Hart
Attorney—Norman S. Blodgett

[57] ABSTRACT

This invention relates to a process for the extraction of non-polar substances from mixtures of polar and non-polar substances by sorbing the non-polar substances on aluminum-deficient molecular sieve zeolites.

8 Claims, 2 Drawing Figures

INVENTOR.
LEONARD B. SAND ent of the invention is the provision of a
SELECTIVE SORPTION OF NON-POLAR MOLECULES

BACKGROUND OF THE INVENTION

The area of selective sorption, especially of traces of impurity in various process streams, has been, and is presently, a matter of interest to scientists and engineers alike. By selective sorption is meant the preferential ingestion of one component of a multicomponent system over the other components by a sorpant material. Sorption may be either absorption, adsorption, or both. The work on selective sorption probably began with the observation that filter beds of certain materials like alumina or activated carbon allow various liquids to pass through them at different rates. This realization led to the discovery that a multicomponent input stream would exit the bed as a steam with time varying composition. This phenomenon is the basis for vapor- and liquid-phase chromatography. The next step was to find a sorbant material which would be more selective, would have more predictable retention times, and would be useful over a wider range of components and systems. A partial answer to this need came with the first economical synthesis of molecular sieve zeolites by researchers at Union Carbide Corporation. Zeolites may be defined as hydrated alkali or alkaline earth alumino-silicates with network structure in which alkali or alkaline earth cations are partially or completely and reversibly ion exchangeable and the water can be partially or completely and reversibly removed. The existence of synthetic zeolites having Rare Earth cations is now recognized. The network of each zeolite is permeated with cylindrical channels of specific diameter from about 3A. to about 9A. depending on the zeolite and the type of cation present. The network is so completely permeated that a gram of some zeolites has the surface area of an average-sized room. The ease of emptying the channels with heat and vacuum and the high charge separation on the interior surfaces make zeolites a powerful "sponge" for any molecules, especially polar molecules of such a size that they will fit into the channels. Since accessible volumes of 50 percent are common, sorption capacity is extensive. Thus, zeolite A (Pore diameter 4A.) would remove water (effective diameter 3A.) from a benzene stream without sorbing benzene (effective diameter 6.7A.).

The affinity of zeolite for polar molecules like water is so much stronger than for non-polar molecules that, even if a large pore zeolite like faujasite (9A.) were used, the water would be almost exclusively sorbed. This result is excellent if it is desired to dry a "wet" process stream. If, however, it is wished to extract benzene from a stream of water, zeolites appear to be useless. Since the idea of removing organic compounds from water or humid gas streams lies at the heart of attempts at pollution control, the incomplete effectiveness of zeolites in these areas significantly reduces the value of zeolite technology.

These and other difficulties experienced with the prior art devices have been obviated in a novel manner by the present invention.

It is, therefore, an outstanding object of the invention to provide a process which allows the extraction of non-polar molecules from mixtures of polar and non-polar molecules.

Another object of this invention is the provision of a process in which a sorbent ingests non-polar molecules preferentially to polar molecules.

A further object of the present invention is the provision of a process in which zeolite sorbents are not rendered essentially ineffective by environmental water.

It is another object of the instant invention to provide a process in which simple inexpensive sorbing apparatus can replace expensive and complex fractionators.

A still further object of the invention to provide a process for industrial separations which is simple to control, effective and inexpensive.

With the foregoing and other objects in view, which will appear as the description proceeds, the invention resides in the combination and arrangement of steps and the details of the composition hereinafter described and claimed, it being understood that changes in the precise embodiment of the invention herein disclosed may be made within the scope of what is claimed without departing from the spirit of the invention.

SUMMARY OF THE INVENTION

In general, this invention relates to a process for the separation of a mixture of substances including the steps exposing an aluminum-deficient zeolite to the mixture, allowing selective sorptions of the favored substance to take place, and removal of the zeolite and ingested sorbate from the mixture.

BRIEF DESCRIPTION OF THE DRAWINGS

The character of the invention, however, may be best understood by reference to one of its structural forms, as illustrated by the accompanying drawings, in which.

The fact that zeolites have a higher affinity for polar than for non-polar molecules has been an accepted fact for some time. Recent work in the field has shown that, as aluminum atoms are removed from the zeolite, the affinity for polar molecules decreases while the affinity for non-polar molecules goes up. Thus, below a certain alumina level (the value will depend on the zeolite and the mixture to be separated) the order of preferred sorption will reverse. This phenomenon opens up a whole new range of usefulness for zeolite sorbents.

Figure 1:
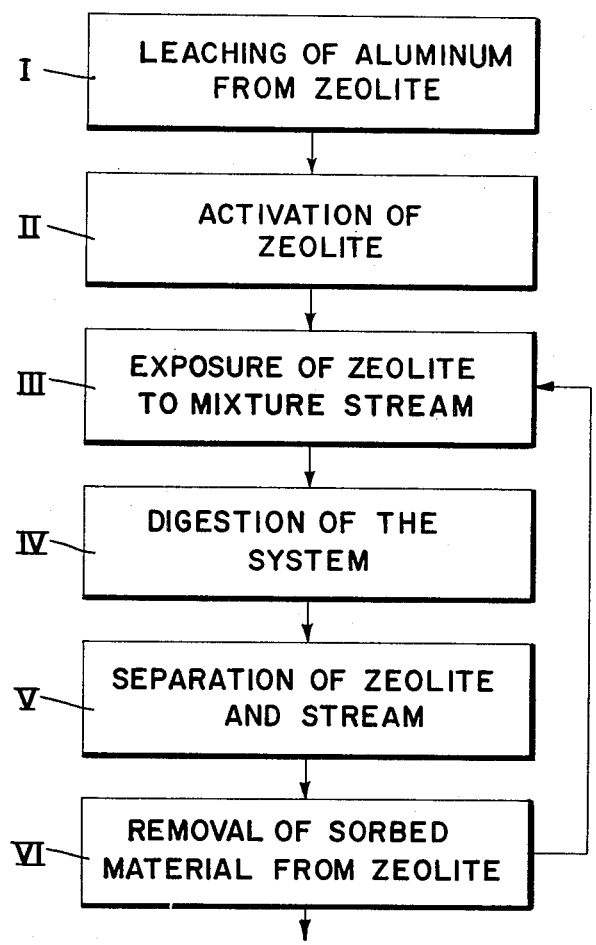
FIG. 1 is a flow chart showing a process making use of the present invention.

FIG. 1 shows a series of process steps which would allow this phenomenon to be used in an industrial scale operation. The first step is the leaching of aluminum from the zeolite. The easiest way to carry out this step is to expose the zeolite to strong inorganic acid or thermal treatment. The optimum acid treatment is found to be reflux boiling in 6N HCl or 6N $HNO_3$ for four hours with an acid-to-sample weight ratio of about 4.0/1. The optimum heat treatment involves air purge at 700°C. for 2 hours.

The activation step consists of preparing the body of zeolite for adsorption. This operation on the first cycle will include pelletizing, if not done before leaching, and evacuating of the pore system by heating. This will generally not be necessary after the first cycle and the latter will often be accomplished in the heat leaching of the first cycle and in the desorption step in subsequent cycles. It is included as a separate step to insure its consideration in process design.

The third step involves exposure of the zeolite to the mixture stream. This can be accomplished by flowing the liquid or vapor mixture stream through a fixed bed of zeolite or through fluidized or moving beds, in a manner well known in the art.

The digestion step, like step II is included more for design purposes than as a physical act. It consists of allowing the system to come to a determined degree of equilibrium. The optimum degree and the flow rate necessary to achieve it can all be determined for each situation using standard engineering technique.

The separation of the zeolite from the stream is accomplished by standard means as diverting the zeolite from the stream, diverting the stream from the zeolite or stopping the stream. It is often important to consider additional removal of excess mixture that is retained on the zeolite mass by exterior surface effects.

The final step is the removal of sorbed material from the zeolite pore system. Depending on the material, this can usually be carried out at moderately high temperature and under slight vacuum. This final step is usually sufficient activation to permit the return of the system to Step II for cyclic operation.

Figure 2:
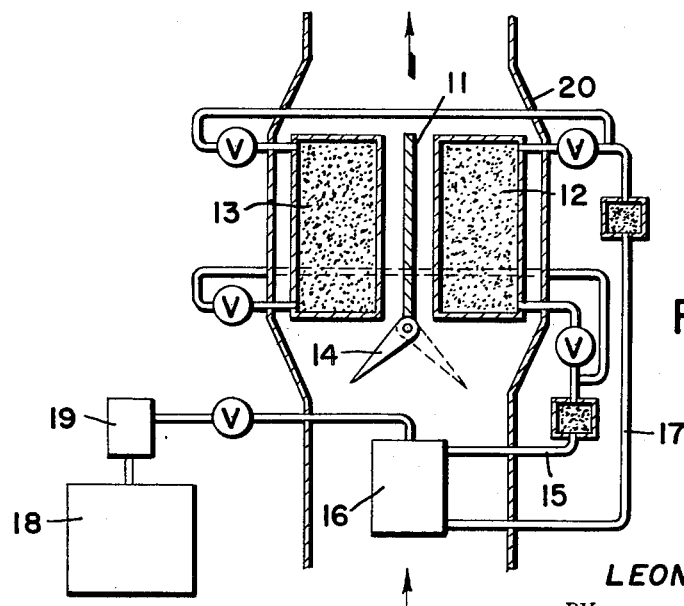
FIG. 2 shows apparatus for carrying out the process.

Having examined the general features of the process, let us turn to FIG. 2 in which is shown a schematic diagram of an apparatus for practical application of the present invention. The apparatus is a two-compartment semi-fixed bed separator mounted in the exit stack of a water-benzene vapor stream. The stream leaches benzene in a counter-current stripper and, after separation, is released to the atmosphere.

The separation generally consists of a stack 20 divided into two channels by a partition 11. The flow of gas through one, another or both of the channels is controlled by a gate 14. Each channel contains a bed of aluminum-deficient synthetic mordenite pellets 12 and 13. Each bed has the peripheral regeneration equipment shown on bed 12. The regeneration system consists of an outlet line 15 which can empty the bed into a regeneration tank 16, the regeneration tank 16 which is positioned in the stream of the flue gas, a return line which lifts the zeolite material from the regeneration tank back to the bed, and system for creating a vacuum in the regeneration tank. This vacuum system consists of a vacuum pump 19 and a storage tank 18 for evacuated gas.

The operation of this system is simple, corresponding directly to operation of normal industrial regenerative sorption equipment. The hot steam-and-benzene vapor mixture flows into the bottom of the stack, by the regeneration tank 16, and through the open channel. As it passes through the bed, the less polar component (benzene) is sorbed into the solid mordenite and the remaining steam is exhausted from the stack. When the capacity of the bed has been reached, the gate 14 is repositioned so that the steam flows through the other channel. The loaded bed is then regenerated. The pallets are allowed to flow through line 15 into the regeneration tank. A vacuum is pulled on the tank which is being heated by the stack gas and the benzene is desorbed from the mordenite. The zeolite is again active and is air-lifted through line 17 to the bed. The process is thus made continuous.

It is obvious that minor changes may be made in the form and construction of the invention without departing from the material spirit thereof. It is not, however, desired to confine the invention to the exact form herein shown and described, but it is desired to include all such as properly come within the scope claimed.

I claim:

1. A process for selective extraction of a less-polar substance from a mixture of polar and less-polar substances, comprising the steps of
   a. activating the body of aluminum-deficient mordenite,
   b. exposing the body to the mixture of polar and less-polar substances,
   c. allowing the less-polar substances to be preferentially adsorbed from the mixture by the aluminum-deficient mordenite, and
   d. separating the body from the mixture.

2. A process as recited in claim 1, wherein the less-polar substance is benzene.

3. A process as recited in claim 1, wherein the less-polar substance is methane.

4. A process as recited in claim 1, wherein the polar substance is water.

5. A process as recited in claim 1, wherein the polar substance is ammonia.

6. A process as recited in claim 1, wherein the alumina level in the mordenite is reduced to less than 1.0 percent.

7. A process as recited in claim 1, wherein the alumina level in the mordenite is reduced to less than 0.5 percent.

8. A process as recited in claim 1, wherein the exposure step includes supporting the mordenite in a fixed bed and flowing the mixture through the bed.

* * * * *